United States Patent Office 3,033,655
Patented May 8, 1962

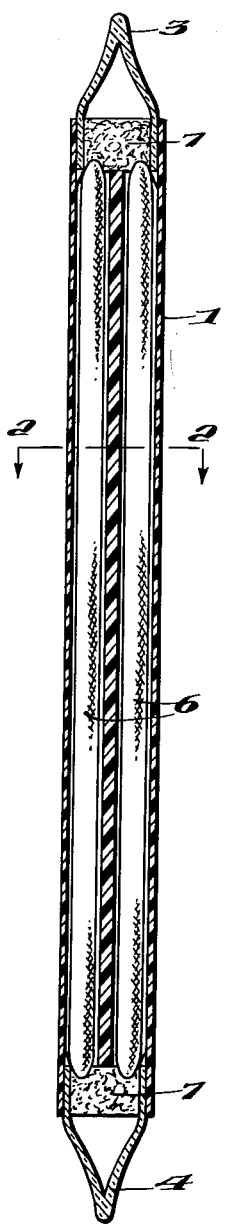
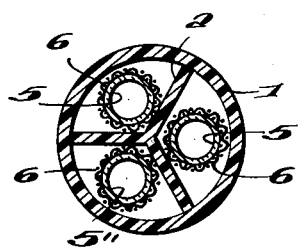
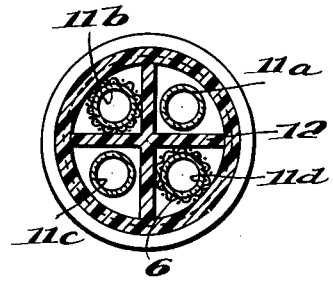
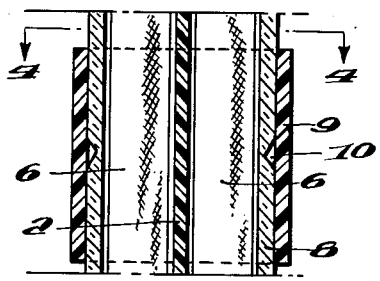
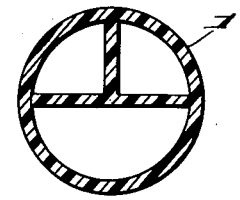

3,033,655
TUBE FOR DETECTING IMPURITIES IN AIR
Carl Grosskopf, Lubeck, Germany, assignor to Otto Heinrich Drager, Lubeck, Germany
Filed Dec. 7, 1960, Ser. No. 74,264
8 Claims. (Cl. 23—254)

The invention relates to a test tube for the detection of impurities in air, and especially for the detection of poison gases.

Test tubes have heretofore been used for this purpose. These generally consist of a small glass tube containing suitable chemicals. By sucking air through the tube with an air pump, any impurities present in the air react with the chemicals to produce color changes and can thus be detected. However, these procedures have the disadvantage that generally each impurity, especially in the case of poison gases, must be detected by a special reagent, so that for the detection of poison gases, for example, a large number of different tubes containing different reagents must be provided, which are used one after the other for testing the air.

It would of course be possible to arrange several test tubes containing different reagents side by side in parallel with each other and with an air conveyor to draw the air simultaneously through these tubes. This method, however, has the disadvantage of an unsymmetrical and, in general, inexactly controllable flow of air through each test tube. The different streams of air through the parallelly arranged test tubes are almost inevitably affected by the fact that these tubes have different air resistances.

It would also seem possible to connect several test tubes containing different reagents one after the other. But this also brings disadvantages, both because of the increase in resistance and because the reagents, because of their vapor pressures, may travel from one test tube into another.

The primary object of the present invention is to overcome the disadvantages of the known testing arrangement.

The invention includes a test tube and provides within this tube walls running in the longitudinal direction of the tube and dividing its interior into two or more chambers lying next to each other. If the air is sucked through this tube, it is distributed to the individual chambers. If the chambers, after the insertion of the reagents, have similar and equal cross-sections, the flow of air through the chambers depends in general on their cross-sections. If the chambers have equal cross-sections and the reagents are similarly arranged in each of them, there is practically an equal flow through all of the chambers.

A simple construction according to the invention consists in providing in a test tube of flexible material an insert of a flexible material. Another advantageous form is one in which a glass test tube is covered on the outside at a predetermined area which is to be broken with a transparent, flexible jacket. Both of these features have the advantage that, within the elongated chambers, breakable ampoules can be arranged, which can be broken by bending of the flexible material which makes up the test tube or, after breaking of the glass test tube, through the transparent jacket, so that the fluids are distributed inside the chambers.

The test tube according to the invention has the advantage that in each chamber a special testing reagent can be introduced, so that with the tube it is possible to carry out simultaneously as many test reactions under similar conditions as the number of separate chambers provided in the test tube.

The arrangement of the reagents in the test tube can be done in different ways. An advantageous construction consists in positioning in the chambers various ampoules which contain the fluid reagents and are covered with an absorptive material. The absorptive material can be wrapped as a jacket around the ampoules. The absorptive material can be cotton cloth, paper or the like. The absorptive material can further hold adsorption media, such as silica gel, or any other inorganic porous carrier.

Further objects and advantages of the invention will appear more fully from the following description, especially when taken in conjunction with the accompanying drawings which form a part thereof.

In the drawings:

FIG. 1 is a vertical cross-section through a test tube embodying the invention;

FIG. 2 is a cross-section on the line 2—2 of FIG. 1;

FIG. 3 shows in vertical cross-section a modified form of the invention;

FIG. 4 is a cross-section on the line 4—4 of FIG. 3; and

FIG. 5 is a cross-section through still a further modification.

The test tube shown in FIG. 1 is formed of a flexible transparent plastic, such as a polyvinyl chloride resin. Within the plastic, flexible outer shell 1 is an insert, which can be made of similar synthetic resin, which consists of three longitudinal walls 2 which are radially positioned and form angles of 120° with each other. In this way three chambers or spaces are formed extending parallel to each other longitudinally of the tube. This insert can be produced from a similar synthetic resin by an extrusion process. An insert formed of such synthetic resin is not completely rigid. It is stiff enough, however, to impart to the tube adequate rigidity.

The tube 1 is closed at both ends by glass closure members 3 and 4, the points of which are breakable. The closures 3 and 4 are so dimensioned that they will fit in the pump head of a conventional gas pump. In the three chambers of the test tube are placed three glass ampoules, 5, 5', 5'', each of which is covered with a jacket 6, for example, of cotton cloth.

The ampoules are of such diameter that they together with their jackets just pass into the sectional chambers. The ampoules are closed at their ends by fibrous inserts 7.

Each of the ampoules, which can, for example, be formed as melting point tubes, is filled with different fluid or liquid reagents. The cloth covers can be impregnated with additional components of the reagent or with absorbents therefor.

The covers can be formed of other materials which are suitable for the testing reaction or for impregnation. For example, wool cloth, synthetic resin cloth, fleece such as filter paper fleece or the like can be used. In these cloths or fleece, adsorption materials such as silica gel can be held.

In some cases, the cloth cover can be left off. It is also possible, instead of using a cloth cover, to adhere the adsorption material, such as silicic acid powder, to the ampoule, for example, by means of a lacquer.

Before the use of the test tube, the points are broken off. Thereafter the test tube is collapsed at a suitable point, so that the ampoules are broken whereupon the reagent fluids wet the covering jackets. The test tube is then put in the mouth piece of the gas pump, by which the air to be tested is drawn through the tube. Because the resistance in the individual chambers is very low and in general is almost equal, the stream of air is distributed equally among the chambers. Because the chambers in the example have equal cross-sections, the amount of air flowing through each chamber is practically the same. This can be accurately determined.

After the air is sucked through, it is possible to determine from the color of the individual reaction chambers which gases are present. In this way it is possible to carry out several test reactions simultaneously. To differentiate the individual chamber sections, these can be made of different colors.

The construction according to the invention assures a satisfactory intimate contact between the air flowing through and the reagents.

As has been said, the air resistance in the construction described is very low in the individual chambers. It is possible, however, if desired, to adjust the amount of air flowing through the different chambers according to the cross-section of the chambers. This can be done by changing the angles at which the longitudinal walls form with each other, so that the cross-section of the chambers and thus their volume is changed.

In the form of the invention shown in FIGS. 3 and 4, the tube 8 is formed of glass, and is constructed at its ends in the same manner as in FIG. 1. At one point along its length, it is surrounded by a sleeve 9 of flexible plastic material. At this point, the tube is provided with a nick 10 to facilitate breakage.

Inside the tube 8 is a separator 12, in the form of a cross, dividing the interior into a series of four chambers, in which are arranged four ampoules, 11a, 11b, 11c and 11d.

As one example, the tube 11a may be used for testing for cyanogen chloride. The ampoule is filled with a solution of 4-benzylpyridine and barbituric acid dissolved in acetone. This has no cover.

Tube 11b is used for testing for phosgene. It contains a solution of N-phenylbenzylamine in alcohol. It has a cotton cloth jacket impregnated with sodium carbonate solution and dried.

Tube 11c is for testing for Lewisite. The ampoule contains a solution of Michler's thioketone in alcohol. There is no cloth cover.

Tube 11d is used for testing for N-Lost (mustard gas). It contains a solution of Dragendorf's reagent (potassium bismuth iodide in ethyl acetate or ether). The outer covering of the ampoule is a filter paper impregnated with silica gel.

Another possible arrangement is shown in FIG. 5, in which a T-shaped insert is used which divides the interior into two chambers of equal volume and a third chamber of double the volume of either of the first two chambers.

It is also possible through varying the dimension of the inlets into the chambers to change the resistance to the air flow and thereby the throughput of air.

For example if, in the form of FIG. 5, it is desired to use one of the reagents in twice the quantity of each of the other two, this can be placed in the largest chamber and the entrance to the chamber can be so dimensioned that the flow of air through all three chambers is practically equal.

While I have described herein some embodiments of my invention, I wish it to be understood that I do not intend to limit myself thereby except within the scope of the claims hereto or hereinafter appended.

I claim:

1. A device for testing gases comprising an elongated transparent tubular member, separating means within the member comprising at least one wall extending longitudinally within the tubular member and dividing it into compartments, glass ampoules containing testing reagents within said compartments, at least one of said glass ampoules having an outer covering of liquid-absorbent material, said tubular member having a portion deformable to permit breaking of the ampoules from the outside of the tube.

2. A device as claimed in claim 1 in which said separating means comprises an insert.

3. A device as claimed in claim 2 in which the tubular member and insert are of flexible material.

4. A device as claimed in claim 1 in which the tubular member is of flexible material.

5. A device as claimed in claim 1 in which the tubular member is of glass and the deformable portion is a breakable portion, and a sleeve of transparent flexible material around the breakable portion.

6. A device as claimed in claim 1 in which the liquid-absorbent material comprises a sleeve on the outside of the ampoule.

7. A device as claimed in claim 6 in which the sleeve is formed of cotton cloth.

8. A device as claimed in claim 1 in which the liquid-absorbent material is paper.

References Cited in the file of this patent

UNITED STATES PATENTS

| | | |
|---|---|---|
| 1,333,850 | Kennedy | Mar. 16, 1920 |
| 2,908,555 | Grosskopf | Oct. 13, 1959 |